United States Patent
Zhao et al.

(10) Patent No.: US 11,773,235 B2
(45) Date of Patent: Oct. 3, 2023

(54) LOW ODOR AND VOLATILES POLYOLEFIN COMPOSITIONS AND METHODS OF PRODUCTION

(71) Applicant: ExxonMobil Chemical Patents Inc., Baytown, TX (US)

(72) Inventors: Bin Zhao, Songjing (CN); Chen Wan, Kingwood, TX (US); George J. Pehlert, Houston, TX (US); Luis A. Sotomayor, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 220 days.

(21) Appl. No.: 17/307,616

(22) Filed: May 4, 2021

(65) Prior Publication Data

US 2021/0355297 A1 Nov. 18, 2021

Related U.S. Application Data

(60) Provisional application No. 63/024,055, filed on May 13, 2020.

(51) Int. Cl.

| C08K 5/13 | (2006.01) |
|---|---|
| C08K 5/526 | (2006.01) |
| C08L 23/08 | (2006.01) |
| C08L 23/12 | (2006.01) |

(52) U.S. Cl.
CPC .............. C08K 5/13 (2013.01); C08K 5/526 (2013.01); C08L 23/08 (2013.01); C08L 23/12 (2013.01); C08K 2201/019 (2013.01)

(58) Field of Classification Search
CPC ........... C08K 5/13; C08K 5/526; C08L 23/08; C08L 23/12
See application file for complete search history.

(56) References Cited

U.S. PATENT DOCUMENTS 5,607,989 A * 3/1997 Bishop .................. C08K 5/524
   524/102
6,172,153 B1   1/2001 Starsinic

FOREIGN PATENT DOCUMENTS

| CN | 1091611 A | 9/1994 |
| CN | 103360701 A | 10/2013 |
| CN | 109294060 A | 2/2019 |
| JP | 2004323734 A | 11/2004 |
| JP | 2006176563 A2 | 7/2006 |
| JP | 2010150417 A * | 7/2010 ............... C08K 3/34 |

OTHER PUBLICATIONS

JP2010150417A English Translation (Year: 2010).*
New Catalyst Neutralizer Polymer Protector Additive for Polyethylene, SPE Polyolefins Conference, Houston, Texas (Feb. 2019).
Patel et al., Mechanisms and Performance of Hydrotalcite Acid Neutralizers in Thermoplastics, Journal of Vinyl and Additive Technology (1995) vol. 1, No. 3.
Das et al., Catalytic Ketonization of Acetic Acid on Zn/Al Layered Double Hydroxides, React. Kinetics Catalysis Letters, (2000) vol. 69, No. 2.
A Method and Process for VOC Reduction in Polypropylene An IP.com Prior Art Database Technical Disclosure IP.com No. IPCOM000263917D IP.com Electronic Publication Date: Oct. 20, 2020.

* cited by examiner

*Primary Examiner* — Ling Siu Choi
*Assistant Examiner* — Huihong Qiao
(74) *Attorney, Agent, or Firm* — Vorys, Sater, Seymour and Pease LLP

(57) ABSTRACT

Disclosed are compositions comprising at least one polyolefin, a hindered phenol, and a phenyl phosphite; wherein the overall concentration of the hindered phenol and phenyl phosphite is within a range from 10 ppm to 5000 ppm in the polyolefin, and wherein the amount of the hindered phenol is less than the phenyl phosphite. Also disclosed herein are compositions comprising at least one polypropylene, a neutralizer, a hindered phenol, and a phenyl phosphite; wherein the overall concentration of the hindered phenol and phenyl phosphite is within a range from 1000 ppm to 5000 ppm in the polyolefin, and wherein the amount of the hindered phenol is from 200 to 2000 ppm less than the phenyl phosphite.

24 Claims, No Drawings

LOW ODOR AND VOLATILES POLYOLEFIN COMPOSITIONS AND METHODS OF PRODUCTION

CROSS-REFERENCE TO RELATED APPLICATIONS

This application claims the priority benefit of U.S. Ser. No. 63/024,055, filed May 13, 2020, which is incorporated herein by reference.

FILED OF THE INVENTION

The present invention is directed to polyolefin compositions having reduced volatile organic compounds and reduced odor, as well as to methods of achieving such compositions, and in particular to improving the additive formulations therein.

BACKGROUND

In automotive industry there is an increasingly demand for cleaner air. As a result automotive suppliers as well as compounders are driving every component they produce and supply to reduced volatile organic compounds ("VOC") and lower odor. Specifically to polypropylene neat resin supplier, reduced odor/VOC polypropylene products, such as homopolymers, propylene-based elastomers, and impact copolymers (heterogeneous blends of hPP and EPR, or "ICP"), are urgently and eagerly favored. However, due to typical polymerization and finishing processes, VOC's and odorous species are very hard to control without additional, capital intensive equipment. For instance, while some producers have steaming and stripping equipment to effectively reduce VOC/odor, most producers will not have such capability. Therefore an innovative way to reduce without capital investment and big process change is highly desired. It would be desirable to improve (reduce) odor and VOC's in polypropylenes without the use of expensive equipment, in particular, to obtain the improvement in the polymer formulations themselves and common finishing equipment.

Related publications include CN 1091611A; CN 109294060A; CN 103360701A; JP 2006176563A2; JP 2004323734A; U.S. Pat. No. 6,172,153A; and "New Catalyst Neutralizer Polymer Protector Additive for Polyethylene," SPE Polyolefins Conference, Houston, Tex. (February 2019).

SUMMARY

Disclosed herein are compositions comprising (or consisting of, or consisting essentially of) at least one polyolefin, a hindered phenol, and a phenyl phosphite; wherein the overall concentration of the hindered phenol and phenyl phosphite is within a range from 10 ppm to 5000 ppm in the polyolefin, and wherein the amount of the hindered phenol is less than the phenyl phosphite.

Also disclosed herein are compositions comprising (or consisting of, or consisting essentially of) at least one polypropylene, a neutralizer, a hindered phenol, and a phenyl phosphite; wherein the overall concentration of the hindered phenol and phenyl phosphite is within a range from 1000 ppm to 5000 ppm in the polyolefin, and wherein the amount of the hindered phenol is from 200 to 2000 ppm less than the phenyl phosphite.

Also disclosed herein are processes comprising (or consisting of, or consisting essentially of) contacting one or more monomers selected from C2 to C12 α-olefins with a catalyst to form polyolefin granules; purging the polyolefin granules with nitrogen at a temperature greater than 50, or 60, or 70° C.; mixing the polyolefin granules with at least a hindered phenol, and a phenyl phosphite; melt blending the mixture of polyolefin granules and additives at a temperature of at least 200° C.; wherein the overall concentration of the hindered phenol and phenyl phosphite is within a range from 10 ppm to 5000 ppm in the polyolefin, and wherein the amount of the hindered phenol is less than the phenyl phosphite; and isolating pellets of finished polyolefin.

DETAILED DESCRIPTION

Disclosed are improved (lower odor and VOC) polyolefin compositions, preferably polypropylenes, compounded or otherwise combined to have desirable additive combinations and desirable quantities of such additives provided in the typical method of forming commercial polypropylene pellets from reactor granules. The primary and secondary additives are preferably of a particular identity, and in a particular ratio to improve both odor and VOC's in the polyolefin composition.

As used herein, a "polyolefin" is a polymer made from α-olefin monomers; "polypropylene" is a polyolefin comprising at least 50, or 60, or 70, or 80 wt %, by weight of the polyolefin, of propylene derived units.

As used herein, a "polypropylene" a polymer including at least 50 wt %, by weight of the polypropylene, of propylene-derived units, examples of which include but are not limited to, polypropylene homopolymers, polypropylene copolymers (including less than 50 wt %, preferably within a range from 0.1 to 20 wt %, of α-olefin derived units), block copolymers (polyolefins having alternate propylene-derived repeat unit section and other α-olefin derived sections), and impact copolymers.

As used herein, an "impact copolymer" is an in situ (reactor) or ex situ (physical) blend of, in one embodiment, a polypropylene homopolymer and within a range from 50, or 40, or 30 wt % to 20, or 10, or 5 wt %, by weight of the impact copolymer, of an α-olefin copolymer, preferably an ethylene-propylene copolymer (or "rubber"), wherein the copolymer or rubber can comprise within a range from 5, or 10, or 20, or 25 wt % to 35, or 40, or 50, or 60 wt %, by weight of the copolymer or rubber, of ethylene derived units or a C4 to C12 α-olefin derived units, the remainder comprising propylene derived units.

As used herein, a "composition" is an intimate blend of at least one polyolefin and at least one additive such as an antioxidant, a slip agent, a nucleating agent, a neutralizer (or "acid scavenger"), an alkyl radical scavenger, or other common additive typically present to no more than 2, or 3, or 4 wt %, by weight of the composition.

In any embodiment is a composition comprising at least one polyolefin, a hindered phenol, and a phenyl phosphite; wherein the overall concentration of the hindered phenol and phenyl phosphite is within a range from 10, or 50, or 100, or 200 ppm to 2000, or 3000, or 4000, or 5000 ppm in the polyolefin, and wherein the amount of the hindered phenol is less than the phenyl phosphite. In any embodiment, the polyolefin is a polypropylene homopolymer or copolymer comprising within a range from 0.1 to 30 wt %, by weight of the copolymer, of ethylene derived units or units derived from C4 to C12 α-olefins. In a preferred embodiment, the polyolefin is an impact copolymer.

In any embodiment, the one or more hindered phenol and one or more phenyl phosphite are the only antioxidants present in the composition; in a preferred embodiment the compositions consists of only one hindered phenol and one phenyl phosphite.

In any embodiment the concentration of each of the hindered phenol and phenyl phosphite is within a range from 50, or 80, or 100, or 200 ppm to 600, or 800, or 1000, or 1200, or 1500, or 2000 ppm. In any embodiment, the concentration of the phenyl phosphite is at least 100, or 200, or 300 ppm less than the concentration of the hindered phenol.

The compositions herein may further comprise other desirable additives, or lack certain additives. For instance, in any embodiment slip agents are absent from the compositions, meaning that such additive is not added to the polyolefin granules when blending other additives to form polyolefin pellets, or are not otherwise added to form the final polyolefin pellets sold commercially. Also, in any embodiment, tallow amine compounds such as those used as antioxidants in some polymers are absent from the compositions, meaning that such additive is not added to the polyolefin granules when blending other additives to form polyolefin pellets, or are not otherwise added to form the final polyolefin pellets sold commercially.

Also, in any embodiment a neutralizer is present in the polyolefin at a concentration within the range from 50, or 100 ppm to 500, or 1000 ppm.

Also, in any embodiment a zeolitic adsorbent is present in the polyolefin at a concentration within the range from 100, or 200 ppm to 500, or 1000, or 2000, or 4000, or 5000 ppm.

Also, in any embodiment a nucleator is present in the polyolefin at a concentration within the range from 100, or 200 ppm to 500, or 1000, or 2000, or 4000, or 5000 ppm.

As used herein, a "hindered phenol" is a molecule, sometimes classified as a primary antioxidant additive in polyolefins, wherein one or more phenol groups are bound to at least one secondary or tertiary carbon such that the molecule aids is scavenging free radicals that form within polyolefins when exposed to air, light, and/or heat.

In any embodiment, hindered phenols comprise compounds having the structure HO—Ph—R, wherein "Ph" is a phenyl group which may or may not be substituted with alkyl groups, and "R" can be any alkyl, ketone, or carboxylate containing hydrocarbyl group. Exemplary commercial embodiments of hindered phenols are such compounds as tocopherols (e.g., vitamin E), Irganox™ 1010 antioxidant, Irganox™ 1076 antioxidant, Irganox™ 1330 antioxidant, Irganox™1425 antioxidant, butylated hydroxytoluene, Irganox™ 129 antioxidant, Irganox™ 431 antioxidant, and Irganox™ 1135 antioxidant. A particularly preferred structure in any embodiment for the hindered phenol is selected from structures (I):

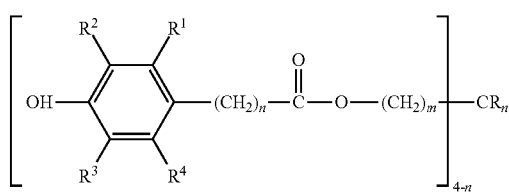

(I)

wherein each $R^1$ to $R^4$ is independently selected from hydrogens, phenyls, alkylphenyls, and $C_1$ to $C_{12}$ alkyls, more preferably, hydrogen and $C_4$ to $C_{10}$ alkyls, and most preferably hydrogen and $C_3$ to $C_8$ secondary or tertiary alkyls; and "n" is 0, 1, 2, or 3; n and m independently range from 1 to 5, or 10; and R is as defined for $R^1$. An example of such a compound is Irganox™ 1010 antioxidant from BASF.

As used herein, a "phenyl phosphite" is a molecule, sometimes classified as a secondary antioxidant additive in polyolefins, wherein at least one phenyl group is bound to a phosphorous atom, typically through an oxygen atom, to form a phosphite such that the compound aids is scavenging free radicals that form within polyolefins when exposed to air, light, and/or heat.

In any embodiment, phenyl phosphites comprise compounds having the structure $P(OR)_3$, wherein each R is independently selected from hydrocarbyl groups, more particularly, a $C_5$ to $C_{20}$ alkyls, aryls, alkylaryls, and arylalkyls. A particularly preferred structure in any embodiment of the phenyl phosphite is selected from structures (II):

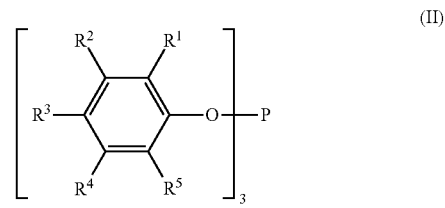

(II)

wherein each $R^1$ to $R^5$ is independently selected from hydrogens, phenyls, alkylphenyls, and $C_1$ to $C_{12}$ alkyls, more preferably, hydrogen and $C_4$ to $C_{10}$ alkyls, and most preferably hydrogen and $C_3$ to $C_8$ secondary or tertiary alkyls. An example of such a compound is Irgofos™ 168 antioxidant from Ciba, Inc. or BASF.

As used herein, a "hydrocarbyl" is any univalent or divalent radical comprising one or more carbon atoms and one or more hydrogen atoms.

As used herein a "slip agent" is any molecule or composition that reduces the coefficient of friction of polyolefin pellets and polyolefin products formed from such pellets such as films, sheets and other articles, and/or reduces the polyolefins inherent tackiness. Slip agents include those that are migratory, or non-migratory. Examples include primary and secondary amine molecules such as oleamide and erucamide, and other fatty acid amides.

As used herein, "neutralizer" refers to molecules or mineral compositions that aid in absorbing protons generated when other molecules such as polymers, catalyst residue and/or other additives break down and or otherwise create acidity within the polyolefin. Examples include sodium benzoate, aluminum benzo-phosphate, calcium stearate, talcite and hydrotalcite (especially Group 1 [e.g., sodium] or Group 2 [e.g. magnesium] compounds of aluminum oxides and/or aluminum carbonates and/or aluminum phosphates, and combinations thereof) and other acid-neutralizing molecules or minerals, such as aluminum magnesium carbonate hydroxide and other such compounds and minerals.

As used herein, an "adsorbent" is a molecule or mineral composition, such as a zeolite, molecular sieve or other silicon-aluminum-phosphate class of minerals and/or compositions, especially molecules and compositions capable of absorbing protons and other acidic species within a polyolefin. In any embodiment, a neutralizer and adsorbent can have the same properties and functions.

As used herein, a "nucleator" is any molecule that, when added to a polyolefin, increases the likelihood (and/or increases the rate at which) the polyolefin chains will align and form lamellae and/or spherulites. Examples include sodium benzoate and tert-butylbenzoic acid. In any embodiment, a nucleator can have the same properties and function as a neutralizer and/or an adsorbent.

The inventive compositions disclosed herein can be described in a number of ways. For instance, in any embodiment the composition comprises (or consists of, or consists essentially of) at least one polypropylene, a neutralizer, a hindered phenol, and a phenyl phosphite; wherein the overall concentration of the hindered phenol and phenyl phosphite is within a range from 1000, or 1500, or 2000 ppm to 4000, or 4500, or 5000 ppm in the polyolefin, and wherein the amount of the hindered phenol is from 200, or 400 to 1500, or 2000 ppm less than the phenyl phosphite.

Described another way, in any embodiment is a composition comprising at least one polyolefin, a hindered phenol, and a phenyl phosphite; wherein the overall concentration of the hindered phenol and phenyl phosphite is less than 2000, or 3000 ppm in the polyolefin, and wherein the amount of the hindered phenol is less than the phenyl phosphite. The polyolefin is preferably a polypropylene homopolymer or copolymer comprising within a range from 0.1 to 30 wt %, by weight of the copolymer, of ethylene derived units or units derived from C4 to C12 α-olefins; and most preferably the polyolefin is an impact copolymer.

In any embodiment, the impact copolymer is an in situ produced composition wherein the polypropylene homopolymer continuous phase is produced in at least one loop slurry reactor and the a-olefin copolymer dispersed phase is made in a tandem gas phase reactor, wherein the granules of impact copolymer (or any polyolefin as described herein) removed from the gas phase reactor are passed through a finishing step or steps of at least heating the granules and purging them, preferably with nitrogen, wherein the heating and purging can be done simultaneously or as separate steps. The polyolefin granules, preferably impact copolymer, in any embodiment can be finished by variously heating, purging and treating with liquids such as water, and/or steamed. Exemplary finishing processes are disclosed in, for example, U.S. Pat. Nos. 7,232,878 and 4,332,933.

In any embodiment, the finished polypropylene granules are blended with the additives (dry blended and/or liquid and dry blended) at a temperature within the range from 30, or 40° C. to 70, or 80, or 100° C. before passing the blend through an extruder such as a single or double screw extruder to melt blend the blend and form finished pellets of polyolefin compositions.

Also disclosed is process comprising contacting one or more monomers selected from C2 to C12 α-olefins with a catalyst to form polyolefin granules; purging the polyolefin granules with nitrogen at a temperature greater than 50, or 60, or 70° C.; mixing the polyolefin granules with at least a hindered phenol, and a phenyl phosphite; melt blending the mixture of polyolefin granules and additives at a temperature of at least 200, or 220° C. (or within a range from 200, or 220° C. to 240, or 260, or 300° C.); wherein the overall concentration of the hindered phenol and phenyl phosphite is within a range from 10, or 50, or 100, or 200 ppm to 2000, or 3000, or 4000, or 5000 ppm in the polyolefin, and wherein the amount of the hindered phenol is less than the phenyl phosphite. The "catalyst" can be any known composition or molecule, supported or not, that is capable of facilitating the polymerization of olefins to form a polyolefin, such as a Ziegler-Natta catalyst, a metallocene or other single-site catalyst, and/or a chromium or vanadium-based catalyst, each with its associated activating agent, if necessary. The manner of "contacting" can take place by any known means such as in a continuous or batch-wise reactor or reactors, and specific types of reactors such as a gas phase reactor, a loop slurry reactor, and combinations thereof.

The examples below demonstrate the embodiments of the invention described herein.

Examples

Additive blending experiments were conducted using a polypropylene impact copolymer (in situ blend of polypropylene homopolymer and ethylene-propylene copolymer) which was collected as granules from the reactor (gas phase reactor, final stage of series loop slurry and gas phase reactors) and purged with nitrogen while heating at about 100° C. prior to the experiments described here. The ICP had an overall melt flow rate (ASTM 1238 230° C., 2.16 kg) of 60 g/10 min, 10.5 wt %, by weight of the ICP, of the EP copolymer, and the EP copolymer had 38 wt %, by weight of the copolymer, of ethylene derived units. Various additives as listed in the Tables were added to portions of the ICP granules in a homogenizer, followed by melt blending the components in a Haake™ twin screw extruder to form pellets of material. Each experiment (separate melt blends of ICP with a combination of additives from Table 1) is sequentially numbered and represented in the Tables below. Example 1 is a control blend of the ICP with no additives. The VOC and odor performance of the ICP samples after being extruded to form pellets were measured using the test method VDA270 (odor); the results are as listed in the data Tables, where lower Odor and VOC values are preferred.

Test Method VDA270 (Odor):
Samples Pretreatment: kept in 23±2° C., 50% humidity and enclosure space for 24 hours, unpacked.
Samples requirement: 20±2 g (cm$^3$) for 1 L vessel.
Panelists number: 5-7 panelists.
Test Conditions: 80±2° C. for 2 hours, panelist start to evaluate at 60±5° C.
Evaluation requirement: distance to the vessel was 1.5 cm-2 cm, interval period was 1 min
Evaluated result: take average amount, and the discrepancy was less than 2 grades.

Test Method VDA278 (VOC): This is a standardized test procedure for non-metallic materials, and was used to test emissions or high, medium, and low volatility compounds. High and medium volatility compounds can be tested as VOC value, while low volatility compounds as Fog values (not disclosed herein). A series of n-alkanes were used to calculate the retention time in the spectrum to define the VOC value range (n-C5 to n-C20). During the analysis procedure, a thermal desorption (TD) apparatus was used; small quantities (10-30 mg) of samples were heated in desorption tubes. For VOCs analysis, two parallel samples were heated at 90° C. for 30 min, the emitted chemicals were trapped in cold trap in TD and later transferred to GC-MS for analysis. One of the heated samples was heated at 120° C. for another 60 min Toluene/hexadecane was used for calibration standard for VOC's calculation.

TABLE 1

Description of the Additives

| Trade or Chemical Name | Description |
|---|---|
| A | Irganox ™ 1010 antioxidant primary antioxidant, hindered phenol |

TABLE 1-continued

Description of the Additives

| | Trade or Chemical Name | Description |
|---|---|---|
| B | Irganox ™ 3114 antioxidant | primary antioxidant, amine-phenolic |
| C | Genox ™ EP antioxidant | primary antioxidant, tallow amine |
| D | Irgastab ™ FS-042 antioxidant | primary antioxidant, tallow amine |
| E | Irgafos ™ 168 antioxidant | Secondary antioxidant, phenyl phosphite |
| F | Ultranox ™ 626 antioxidant | Secondary antioxidant, phenyl phosphite |
| G | Sodium Benzoate | neutralizer, nucleator |
| H | AKD ™ NA-21 nucleating agent | neutralizer, nucleator, aluminum benzo-phosphate |
| I | Oleamide | Slip agent, fatty acid amide |
| J | Calcium Stearate | neutralizer |
| K | DHT-4V ™ adsorbent | neutralizer, hydrotalcite |
| L | MPI 37L adsorbent | neutralizer (Mitsui Plastics Inc.) |
| M | Zeoflair ™ 100 adsorbent | Adsorbent, zeolite (Zettachem International) |
| N | Zeoflair ™ 810 adsorbent | Adsorbent, zeolite (Zettachem International) |
| O | PTBBA | Nucleator, Para-tert-butylbenzoic acid |

TABLE 2

Experiments 1-7, additives in ppm

| | 1 | 2 | 3 | 4 | 5 | 6 | 7 |
|---|---|---|---|---|---|---|---|
| A | — | 1500 | 1500 | 1500 | 1500 | 1500 | — |
| B | — | — | — | — | — | — | 1500 |
| C | — | — | — | — | — | — | — |
| D | — | — | — | — | — | — | — |
| E | — | — | — | — | — | 1000 | 1000 |
| F | — | 500 | 500 | 500 | 500 | — | — |
| G | — | 900 | 900 | 900 | 900 | 900 | 900 |
| H | — | — | — | — | — | — | — |
| I | — | 500 | 500 | 500 | 500 | 500 | 500 |
| Odor | 2.4 | 3.1 | 3 | 3 | 2.9 | 3.3 | 4.2 |
| VOC | 30.2 | 32 | 32.1 | 28.7 | 30.8 | 31.4 | 30.8 |

TABLE 3

Experiments 8-15, additives in ppm

| | 8 | 9 | 10 | 11 | 12 | 13 | 14 | 15 |
|---|---|---|---|---|---|---|---|---|
| A | — | 500 | 1500 | 1500 | 1500 | — | — | 1500 |
| B | 1500 | — | — | — | — | — | — | — |
| C | — | — | — | — | — | 1500 | — | — |
| D | — | — | — | — | — | — | 1500 | — |
| E | — | 1000 | — | — | — | — | — | 1000 |
| F | 500 | — | 500 | 500 | 500 | 500 | 500 | — |
| G | 900 | — | 900 | 900 | 900 | 900 | 900 | 900 |
| H | — | 900 | — | — | — | — | — | — |
| I | 500 | — | 500 | 500 | 500 | 500 | 500 | 500 |
| J | — | 600 | — | — | — | — | — | — |
| K | — | — | — | — | — | — | — | 300 |
| L | — | — | 800 | — | — | — | — | — |
| M | — | — | — | 1000 | — | — | — | — |
| N | — | — | — | — | 1000 | — | — | — |
| Odor | 3.7 | 2.6 | 2.4 | 2.7 | 3.8 | 3.9 | 3.7 | 4.4 |
| VOC | 30.8 | 27.7 | 31.2 | 27.5 | 35.5 | 32 | 30.3 | 32.5 |

TABLE 4

Experiments 16-23, additives in ppm

| | 16 | 17 | 18 | 19 | 20 | 21 | 22 | 23 |
|---|---|---|---|---|---|---|---|---|
| A | 1500 | 1500 | 500 | 500 | 500 | 500 | — | — |
| C | — | — | — | — | — | — | 500 | — |
| D | — | — | — | — | — | — | — | 500 |
| E | — | — | 1000 | 1000 | 1000 | 1000 | 1000 | 1000 |
| F | 500 | 500 | — | — | — | — | — | — |
| G | 900 | 900 | — | — | — | — | — | — |
| H | — | — | 900 | 900 | 900 | 900 | 900 | 900 |
| I | 500 | — | — | 500 | — | — | — | — |
| J | — | — | 600 | 600 | — | — | 600 | 600 |
| K | — | — | — | — | 300 | — | — | — |
| L | — | — | — | — | — | 600 | — | — |
| Odor | 3.4 | 3.1 | 2.9 | 3.2 | 3.7 | 2.9 | 3.7 | 4 |
| VOC | 36.7 | 37.2 | 33.8 | 32.9 | 32 | 31.4 | 28.3 | 28.9 |

TABLE 5

Experiments 24-31, additives in ppm

| | 24 | 25 | 26 | 27 | 28 | 29 | 30 | 31 |
|---|---|---|---|---|---|---|---|---|
| A | 1500 | 500 | 500 | 500 | 375 | 300 | 750 | 1000 |
| E | — | 1000 | 1000 | 1000 | 1125 | 1200 | 750 | 500 |
| F | 500 | — | — | — | — | — | — | — |
| G | 900 | — | — | — | — | — | — | — |
| H | — | — | — | — | — | — | — | — |
| I | 500 | — | — | — | — | — | — | — |
| J | — | 600 | — | — | 600 | 600 | 600 | 600 |
| K | — | — | 600 | — | — | — | — | — |
| L | — | — | — | 600 | — | — | — | — |
| Odor | 4.4 | 3.6 | 3.7 | 3.4 | 3.6 | 3.1 | 3.5 | 3.5 |
| VOC | 33.19 | 29.41 | 28.14 | 25.98 | 28.89 | 29.48 | 30.48 | 29.62 |

TABLE 6

| Experiments 32-41, additives in ppm | | | | | | | | | | |
|---|---|---|---|---|---|---|---|---|---|---|
| | 32 | 33 | 34 | 35 | 36 | 37 | 38 | 39 | 40 | 41 |
| A | 1500 | 1500 | 500 | 500 | 500 | 500 | 500 | 300 | 300 | 300 |
| E | — | — | 1000 | 1000 | 1000 | 1000 | 1000 | 1200 | 1200 | 1200 |
| F | 500 | 500 | — | — | — | — | — | — | — | — |
| G | 900 | 900 | — | 900 | — | — | — | 900 | — | — |
| O | — | — | — | — | 900 | 900 | 900 | — | 900 | 900 |
| I | 500 | 500 | — | — | — | — | — | — | — | — |
| J | — | — | 600 | — | — | 600 | 600 | — | — | 600 |
| K | — | — | — | 600 | 600 | — | — | 600 | 600 | — |
| Odor | 3 | 3 | 2 | 3 | 2.5 | 3.5 | 3.5 | 2.5 | 3 | 2.5 |

From experimental results outlined in the Tables 2 to 4, it appears that odor performance of the polypropylene can be improved by optimizing the ratio of primary antioxidant (hindered phenol) and secondary antioxidant (phenyl phosphite), and optional removal of slip agent. Addition of zeolite absorbent has mixing effect on odor performance and seems to help when the antioxidant mix is ideal. The odor and VOC results further confirmed following:

Lower total amount of antioxidants (AO) from 2000 ppm to 1500 ppm and readjusting the antioxidant ratio (primary AO vs. secondary AO) from 3:1 to 1:2 lowered the odor to 0.2-0.5 unit. A small reduction (≥10%) in total VOC were also observed;

Removal of slip agent (such as oleamide) improved the odor performance;

Neutralizers help in improving odor.

The experiments outlined in Tables 5 and 6 were performed as in Tables 2 to 4, and were designed to further fine tune the antioxidant ratio, as well as the addition or removal of other additives, and understand their impact on odor performance. These tests demonstrate that:

An antioxidant ratio of 1:2 and total antioxidant loading of 1500 ppm consistently improved the odor performance. A reduction (~10%) in total VOC was also observed;

Further lower amount of hindered phenol (such as Irganox™ 1010) can improve the odor performance.

The phrase "consisting essentially of" means that no other additives (antioxidants, antistatic agents, slip agents, antiblocking agents, peroxides, cross-linkers, fillers) are present in the composition being referred to other than those named, or, if present, are present to a level no greater than 0.5, or 1.0, or 2.0, or 4.0 wt % by weight of the composition; and in a process, "consisting essentially of" means that no other major process step is present or effects the claimed composition properties such that the value would be outside the claim scope.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby.

The invention claimed is:

1. A composition comprising:
   at least one polyolefin, a hindered phenol, and a phenyl phosphite;
   wherein the overall concentration of the hindered phenol and the phenyl phosphite is within a range from 10 ppm to 5000 ppm in the at least one polyolefin, an amount of the hindered phenol is less than the phenyl phosphite, and the hindered phenol and the phenyl phosphite are the only antioxidants present in the composition.

2. The composition of claim 1, wherein the at least one polyolefin is a polypropylene homopolymer or copolymer comprising within a range from 0.1 to 30 wt %, by weight of the copolymer, of ethylene derived units or units derived from C4 to C12 α-olefins.

3. The composition of claim 1, wherein the at least one polyolefin is an impact copolymer.

4. The composition of claim 1, wherein the concentration of each of the hindered phenol and the phenyl phosphite is within a range from 50, or 80, or 100, or 200 ppm to 600, or 800, or 1000, or 1200, or 1500, or 2000 ppm.

5. The composition of claim 1, wherein slip agents are absent.

6. The composition of claim 1, wherein a neutralizer is present in the at least one polyolefin at a concentration within a range from 50, or 100 ppm to 500, or 1000 ppm.

7. The composition of claim 1, wherein a zeolitic adsorbent is present in the at least one polyolefin at a concentration within a range from 100, or 200 ppm to 500, or 1000, or 2000, or 4000, or 5000 ppm.

8. The composition of claim 1, wherein a nucleator is present in the at least one polyolefin at a concentration within a range from 100, or 200 ppm to 500, or 1000, or 2000, or 4000, or 5000 ppm.

9. The composition of claim 1, wherein the at least one polyolefin comprises at least one polypropylene, and the composition further comprises a neutralizer;
   wherein the overall concentration of the hindered phenol and the phenyl phosphite is within a range from 1000 ppm to 5000 ppm in the at least one polyolefin, and the amount of the hindered phenol is from 200 to 2000 ppm less than the phenyl phosphite.

10. The composition of claim 9, wherein the at least one polypropylene is a polypropylene homopolymer or copolymer comprising within a range from 0.1 to 30 wt %, by weight of the copolymer, of ethylene derived units or units derived from C4 to C12 α-olefins.

11. The composition of claim 9, wherein the at least one polypropylene is an impact copolymer.

12. The composition of claim 9, wherein slip agents are absent.

13. The composition of claim 9, wherein a zeolitic adsorbent is present in the at least one polyolefin at a concentration within a range from 100, or 200 ppm to 500, or 1000, or 2000, or 4000, or 5000 ppm.

14. The composition of claim 9, wherein a nucleator is present in the at least one polyolefin at a concentration within a range from 100, or 200 ppm to 500, or 1000, or 2000, or 4000, or 5000 ppm.

15. A process comprising:
contacting one or more monomers selected from C2 to C12 α-olefins with a catalyst to form polyolefin granules comprising at least one polyolefin;
purging the polyolefin granules with nitrogen at a temperature greater than 50, or 60, or 70° C.;
mixing the polyolefin granules with additives including at least a hindered phenol, and a phenyl phosphite to form a mixture; and
melt blending the mixture of the polyolefin granules and the additives at a temperature of at least 200° C.;
wherein the overall concentration of the hindered phenol and the phenyl phosphite is within a range from 10 ppm to 5000 ppm in the at least one polyolefin, the amount of the hindered phenol is less than the phenyl phosphite, and the hindered phenol and the phenyl phosphite are the only antioxidants present.

16. The process of claim 15, wherein the at least one polyolefin is a polypropylene homopolymer or copolymer comprising within a range from 0.1 to 30 wt %, by weight of the copolymer, of ethylene derived units or units derived from C4 to C12 α-olefins.

17. The process of claim 15, wherein the at least one polyolefin is an impact copolymer.

18. The process of claim 15, wherein the concentration of each of the hindered phenol and the phenyl phosphite is within a range from 50, or 80, or 100, or 200 ppm to 600, or 800, or 1000, or 1200, or 1500, or 2000 ppm.

19. The process of claim 15, wherein no slip agent is present.

20. The process of claim 15, wherein a neutralizer is present in the at least one polyolefin at a concentration within a range from 50, or 100 ppm to 500, or 1000 ppm.

21. The process of claim 15, wherein a zeolitic adsorbent is present in the at least one polyolefin at a concentration within a range from 100, or 200 ppm to 500, or 1000, or 2000, or 4000, or 5000 ppm.

22. The process of claim 15, wherein a nucleator is present in the at least one polyolefin at a concentration within a range from 100, or 200 ppm to 500, or 1000, or 2000, or 4000, or 5000 ppm.

23. A composition comprising:
at least one polyolefin, a hindered phenol, and a phenyl phosphite;
wherein the overall concentration of the hindered phenol and the phenyl phosphite is within a range from 10 ppm to 5000 ppm in the at least one polyolefin, and an amount of the hindered phenol is less than the phenyl phosphite, wherein the hindered phenol and the phenyl phosphite are the only antioxidants present in the composition and wherein the at least one polyolefin comprises a blend of a polypropylene homopolymer and an a-olefin copolymer within a range from 5 to 50 wt %, by weight of the at least one polyolefin.

24. The composition of claim 23, wherein the a-olefin copolymer comprises within a range from 0.1 to 30 wt %, by weight of the α-olefin copolymer, of ethylene derived units or units derived from C4 to C12 α-olefins.

* * * * *